2,922,749
ENZYMES

Eric G. Snyder, Verona, and Stephen Joseph Gagan, Clifton, N.J., assignors to Miles Laboratories, Inc., a corporation of Indiana No Drawing. Application July 17, 1953
Serial No. 368,831

2 Claims. (Cl. 195—66)

This invention relates to the separation of enzymes from aqueous solutions or suspensions containing them, and more particularly to the precipitation and recovery of the enzymes in dry stable form.

Various methods have heretofore been employed for precipitating an enzyme from aqueous solution, each of them leaving something to be desired. Thus, salts like ammonium or sodium sulfate have been added in large quantities to an enzyme solution to precipitate the enzyme, but the salts, at least a portion of which follow the enzyme precipitate, interfere with the drying of the precipitate; furthermore, they prohibit the use of the salt-containing enzyme in many products and processes, particularly in foods and in the preparation of foods. Other enzyme coprecipitants also render the enzyme unsuitable for use in products intended for human consumption. Organic solvents like ethanol, isopropanol, acetone, etc. have been used to precipitate enzymes from aqueous solutions, and it has been found that impurities present in the original enzyme solution, such as gums, sugars and other carbohydrates, precipitate with the enzyme protein to give a gummy and sticky precipitate which is difficult to handle without appreciable loss of enzyme activity; when it is attempted to dry such precipitates, lumpy products are obtained which require to be comminuted by grinding, a procedure which usually causes further losses of enzyme activity. Another disadvantage attending the prior use of solvents for precipitating enzymes is the fact that the amount of the precipitate obtained is usually very small in comparison to the volume of the original enzyme solution. The economical recovery of a few pounds of valuable enzyme precipitate from hundreds of gallons of liquor, without incurring costly losses in handling, is a formidable task which cannot always be readily accomplished. Due to the varying potency of these precipitated enzyme products, efforts have been made to mechanically blend with them certain solid materials like sugar or diatomaceous earth to produce mixtures in which the enzyme activity would be more nearly uniform. These mechanically blended mixtures have provided other difficulties, such as those due to the hygroscopic nature of the sugar or to the unsuitability of diatomaceous earth in food products, and, more significantly, the tendency of these blended mixtures to stratify and form potency-rich and potency-poor layers, such stratification being noticeable particularly after transportation of the mixture and probably being the result of the vibrations to which it was subjected.

According to the present invention, it is proposed to precipitate the enzyme from an aqueous solution or suspension, or extract, containing it by means of an organic solvent and in the presence of an inert diluent, there being formed an intimate mixture of finely divided solids comprising the diluent and the precipitated enzyme. The presence of the diluent avoids the formation of gummy or sticky precipitates or lumpy products which are difficult to dry. Generally speaking, the invention comprises mechanically mixing the aqueous solution or suspension of the enzyme and a water-miscible volatile organic solvent in the presence of the diluent, the latter being soluble in water but substantially insoluble in the solvent. Usually, the aqueous solution or suspension of enzyme is added to the solvent in the presence of the diluent, and during the addition, the solvent is well agitated. A mixture of solid enzyme and solid diluent is formed, and this mixture is collected, washed and dried. In a preferred method, the aqueous solution or suspension of the enzyme is added to a suspension of the diluent in the organic solvent, agitation of the diluent-solvent suspension being carried out during the addition, and the solid mixture that is formed, comprising the enzyme and the diluent, is separated by filtration or centrifugation, washed, and dried. An alternative method comprises adding the diluent, either in solid form or in the form of a concentrated aqueous solution, to the aqueous enzyme solution or enzyme suspension, the diluent dissolving therein, and then the enzyme-diluent solution is added to the organic solvent, with stirring, to form a mixed precipitate of enzyme and diluent. In the latter method the diluent is coprecipitated with the enzyme protein, an intimate mixture being obtainable by virtue of the coprecipitation; in the preferred method the enzyme protein is precipitated upon the solid diluent, the precipitate coating and adhering to the diluent particles to produce an intimate mixture that may be filtered or centrifuged from the supernatant liquor, washed, and dried.

In some cases the solvent may advantageously be added, with stirring, to the aqueous enzyme solution or suspension, the diluent being either dissolved in the enzyme solution or suspended in the solvent.

The aqueous enzyme solution or suspension which may be processed according to the invention may contain any enzyme that is stable enough to be precipitated; it may also contain mixtures of enzymes, or an enzyme (or enzymes) present in the form of a complex with its substrate or reaction product. In addition to naturally occurring impurities, like gums, sugars and other carbohydrates, inert protein matter and the like, it may contain substances added as stabilizers and activators, such as inorganic salts, and also salts and materials used for adjusting the pH of the enzyme solution or suspension. Some examples of enzyme solutions or suspensions that may be processed to yield a solid enzyme precipitate are those of an enzyme of oxidation such as glucose oxidase, catalase, or a mixture of glucose oxidase and catalase; a proteolytic enzyme like proteases and peptidases, including pepsin, trypsin, papain, and the like; carbohydrases such as pectolytic enzymes; and amylases derived from cultures of fungi and bacteria; urease, invertase, lipases, phosphatases, peroxidases, sulfatases, phenolases, etc. Particularly suitable enzyme solutions that may be treated are solutions of glucose oxidase and solutions of mixtures of glucose oxidase and catalase.

The diluent, as noted, is soluble in water and in the aqueous enzyme solution; it is substantially insoluble in the organic solvent, or more particularly, in the supernatant liquor comprising solvent and water. It is inert to all of the materials employed in the method. In particular, it is non-injurious to the enzyme, and it is non-toxic to humans and animals so that it may be used in the preparation of food products. Modified celluloses have been found to be particularly suitable as diluents, some examples of which are sodium carboxy-methyl cellulose, sodium carboxyethyl cellulose, sodium hydroxymethyl cellulose, sodium hydroxyethyl cellulose, water soluble hydroxyethyl cellulose, water soluble methyl cellulose, and water ethyl cellulose. Another useful diluent is sodium carboxymethyl starch, which, like the foregoing cellulose derivatives, is a modified polysaccharide in which the modifying group is connected to the polysaccharide molecule through an ether linkage. By "polysaccharide" is meant a carbohydrate having more than four monosaccharide units. Other useful diluents are water soluble alginates, pectin, vegetable gums like gum Karaya and gum Tragacanth, and polysaccharides from Irish Moss. By "water soluble alginates" it is intended to include alginic acid as well as water soluble salts of the same such as the sodium, potassium, and ammonium salts. A preferred diluent is sodium carboxymethyl cellulose. The potassium and ammonium salts may be used in place of the sodium salt of the foregoing diluents.

The organic solvent is a low molecular weight aliphatic oxygen-containing compound selected from the class consisting of alkoxy, keto and hydroxy compounds. The solvent is miscible with water, not injurious to the enzyme, and sufficiently volatile so that the precipitated enzyme product can be dried at atmospheric pressure or under vacuum at temperatures that are not injurious to the enzyme, preferably at room temperatures. Solvents having a boiling point in the range of about 40 to about 110° C. are preferred. Suitable solvents are methanol, ethanol, isopropanol, propanol, isobutanol, acetone, methylethyl ketone and dioxane. Ethanol is a preferred solvent. In this connection it is to be understood that in referring to these compounds as "solvents" it is intended to denote their general or common use as solvents; the enzyme, of course, is precipitated by the compounds.

The concentration of the enzyme in the aqueous enzyme solution, from which the enzyme is to be precipitated, may vary from the saturation value down to any desired dilution. The pH of the aqueous enzyme solution should be in a range where the stability of the enzyme protein is greatest and where its tendency to become denaturized and thus inactivated is the least. Ordinarily, the pH should be in the isoelectric range of the enzyme protein, but it may be outside this range, particularly if refrigerated enzyme solutions and cold solvents are used. The amount of diluent which is employed in the process depends on the level of enzyme activity which is desired in the finished product. As illustrative of the latter, a product comprising a 1:1 mixture, by weight, of diluent and enzyme is preferred; this ratio may vary to 10:1, or more, and may be less than 1:1. Generally, as stated, the ratio of diluent to enzyme may vary as desired, depending on the demand. The amount of organic solvent should be sufficient to insure complete precipitation of the enzyme protein from the aqueous enzyme solution. The amount of solvent should also be great enough to prevent substantial loss of the inert diluent by solution in the liquor from which the enzyme and diluent are precipitated. Excess solvent should not be used, not only for economic reasons but also to avoid as much as possible precipitation of undesirable impurities which may be present in the aqueous enzyme solution. As may be appreciated, the amount of solvent will vary for different enzymes and solvents; generally speaking, however, the amount of solvent in the solvent-aqueous enzyme solution mixture, from which the enzyme and diluent are precipitated, is usually from about 40% to about 80% by volume; for preferred solvents like ethanol and acetone the amount is usually 50 to 75% by volume.

The temperature at which the addition and mixing operation is carried out may vary from the freezing point of the aqueous enzyme solution to about 50° C.; temperatures from 5 to 25° C. are preferred.

The invention may be illustrated by the following examples:

*Example 1*

Into 3 gallons of cold (9° C.) 95 percent ethanol 44 gms. of sodium carboxymethyl cellulose powder were dispersed and kept suspended by vigorous agitation. To this was added slowly, with continuous agitation, 1 gallon of cold (15° C.) aqueous enzyme solution (pH=6.8) containing the enzymes glucose oxidase and catalase. This enzyme solution had been obtained from the culture of a strain of *Aspergillus niger*. After precipitation of the enzymes, agitation was discontinued and the mixture of solids consisting of the sodium carboxymethyl cellulose and the enzyme precipitate was allowed to settle. The supernatant liquor was siphoned off and the solids were collected from the remaining slurry by centrifuging. They were washed three times with ethanol and then dried in vacuum at 20–25° C. A total of 89.4 gms. of dried solids was obtained. The following tabulation gives some quantitative details regarding the recovery of enzyme potency.

Volume of aqueous enzyme solution—3780 ml.
Enzyme activity of aqueous solution:
  Glucose oxidase—40 units per ml.=151,200 units total
  Catalase—29 units per ml.=109,620 units total
Enzyme activity of dried solids:
  Glucose oxidase—1683 units per gram=150,460 units total
  Catalase—1260 units per gram=112,644 units total
Recovery:
  Glucose oxidase—99.5%
  Catalase—100%

A glucose oxidase unit is defined as the amount of glucose oxidase which will cause an oxygen uptake of ten microliters per minute when the enzyme acts on glucose as substrate under standard conditions. One unit of catalase is defined as the amount of enzyme which will decompose 300 mg. hydrogen peroxide under standard conditions.

*Example 2*

Nine grams of citrus pectin were dispersed and kept suspended with vigorous agitation in 3 liters of cold (9° C.) 95 percent ethanol. To this one liter of cold (16° C.) aqueous enzyme solution (pH=6.5) containing glucose oxidase (potency=25,000 units, total) and catalase (potency=16,000 units, total) was added slowly. The solids were allowed to settle and were collected by centrifuging after the supernatant liquor had been siphoned off. The collected solids were washed with cold ethanol and dried in vacuum at 20–25° C.; yield, 16.9 gms. The recovery of potency of glucose oxidase was 94.8%, and of catalase, 93.3%.

*Example 3*

Ten grams of sodium carboxymethyl cellulose were dissolved by vigorous agitation in one liter of cold (15° C.) aqueous enzyme solution containing the enzymes glucose oxidase and catalase. The solution had a pH of 6.5, a glucose oxidase activity of 25,000 units, and a catalase activity of 19,000 units. This solution was then added slowly and with vigorous agitation to 3 liters of cold (9° C.) 95 percent ethanol. The suspension was allowed to settle, the solids were collected as in Examples 1 and 2 and washed repeatedly with cold (8° C.) ethanol. They were then dried in vacuum at 20–25° C. Yield, 19.7 gms. Recovery of glucose oxidase, 99.4%; recovery of catalase, 95.6%.

*Example 4*

Nine grams of sodium carboxymethyl cellulose powder were dissolved with vigorous agitation in one liter of aqueous enzyme solution containing the enzymes glucose oxidase and catalase. Solution pH, 6.8; glucose oxidase activity, 25,000 units; catalase activity, 17,000 units. The solution was added slowly and with vigorous mixing to 3 liters of cold (11° C.) dioxane. The precipitate which was formed was allowed to settle and, after removal of the supernatant, was collected by centrifuging and further dehydrated by washing three times with cold dioxane. The collected solids were dried in vacuum at 20–25° C. Yield, 19.7 gms. Recovery: glucose oxidase, 94%; catalase, 82.3%.

Example 5

Into 3 gallons of cold (9° C.) methanol, 40 grams of sodium alginate powder were dispersed and kept suspended by vigorous agitation. To this mixture was added slowly and with constant mixing, 1 gallon of cold (15° C.) aqueous enzyme solution containing glucose oxidase and catalase. The enzyme solution had a pH of 6.8, a glucose oxidase potency of 98,280 units, and a catalase potency of 73,460 units. The agitation was continued for 10 minutes, and the precipitate and suspended solids were then allowed to settle. They were washed with cold (8° C.) methanol and recovered as described in the preceding examples. Yield, 56.6 gms. Recovery: glucose oxidase, 84.1%; catalase, 67.1%.

Example 6

To a vigorously agitated suspension of 10 grams citrus pectin powder in 2.25 liters of cold (9° C.) 95% ethanol, there was added slowly one liter of cold (14° C.) aqueous enzyme solution containing amylase (diastase) derived from the culture of a selected strain of *Bacillus subtilus*. After the addition had been completed, agitation was continued for 5 minutes to complete the precipitation. The mixed solids were dehydrated, collected and dried as described in the preceding examples. From the following tabulation, quantitative details regarding the enzyme recovery can be obtained:

Volume of aqueous solution—1000 ml.
Amylase activity of aqueous enzyme solution (defined as mg. maltose formed under standard conditions from starch per mg. amylase solution)—5.275 mg. maltose per mg. solution, or 5,275,000 mg. maltose, total.
pH of aqueous enzyme solution—6.6.
Weight of dried mixed solids—43.6 grams.
Amylase activity of dried solids—115.2 mg. maltose per mg. solids or 5,025,000 mg. maltose, total.
Amylase recovery: 95.3%.

Example 7

To a vigorously agitated suspension of 5 grams sodium carboxymethyl cellulose in 750 ml. of cold (9° C.) isopropyl alcohol, 500 ml. of cold (16° C.) aqueous enzyme solution containing amylase derived from the culture of a selected strain of *Aspergillus oryzae* was added slowly with constant mixing. Agitation was continued until the precipitation was completed, and the mixed solids, after repeated washing with cold (8° C.) isopropyl alcohol, were recovered as described in the preceding examples. The following details were noted:

Volume of aqueous solution—500 ml.
Amylase activity of aqueous enzyme solution (as defined in Example 6)—6.512 mg. maltose per mg. enzyme solution or 3,256,000 mg. maltose, total.
pH of aqueous enzyme solution—6.9.
Weight of dried solids—16.86 grams.
Amylase activity of dried solids—156.4 mg. maltose per mg. solids or 2,637,360 mg. maltose, total.
Amylase recovery—81%.

Example 8

Into 1500 ml. cold (9° C.) acetone, 10 grams of citrus pectin powder were dispersed and kept suspended by vigorous agitation. To this, one liter of cold (13° C.) aqueous enzyme solution containing amylase derived from the culture of a selected strain of *Aspergillus oryzae* was added slowly with constant mixing. This enzyme solution had a pH of 6.4 and an activity of 4,890,000 mgs. maltose, total. Agitation was continued until precipitation was completed. The mixed solids were then washed with cold acetone and dried in vacuum at 20–25° C. Yield, 36.7 gms. Amylase recovery, 87.7%.

As may be appreciated, and as compared to prior practice, the provision of the enzyme in the form of a solid mixture of enzyme and diluent results in reduced losses of enzyme, particularly in the steps of precipitating and collecting the enzyme; the presence of the diluent enables a larger quantity of solid material to be handled, so that losses of this material are not as serious as in the absense of the diluent. The user of the enzyme-diluent mixture will also have reduced losses. Another advantage of the invention lies in the fact that solid enzyme materials are provided having a uniform potency; in other words, the potency of a given enzyme-diluent mixture may be reproduced from batch to batch because it is a simple matter to calculate the amount of diluent that is to be associated with the enzyme from a given aqueous solution, once the potency of the latter solution is known. Another and a significant advantage of the invention is the homogeneous character of the enzyme-diluent solid mixture; the particles of the enzyme and of the diluent are not mechanically separable from each other, and they do not separate or stratify during handling, storage, transportation or use. As demonstrated by the examples, this mixture can be filtered or centrifuged, washed, and dried without being separated into its components. Another important advantage of this mixture lies in the water soluble character of the diluent, which thus permits the user to employ the mixture in aqueous food solutions or suspensions without the necessity of filtering off water-insoluble residues, as, for example, would be required in the case of the enzyme-diatomaceous earth blends referred to above.

In the light of the foregoing description, the following is claimed:

1. Process of preparing an enzyme in solid, dry, stable form from a water extract of the same, said enzyme being stable on precipitation and being selected from the class consisting of glucose oxidase, catalase, amylase, and mixtures of glucose oxidase and catalase, which comprises dispersing in a water-miscible, volatile organic solvent an inert, water-soluble, solvent-insoluble diluent to form a dispersion of said diluent in the solvent, then contacting the dispersion with said water extract of the enzyme to produce a resulting liquor in which said enzyme precipitates and in which said diluent is substantially insoluble, said diluent being in the form of solid particles in the liquor and said precipitate coating and adhering to said particles; said solvent being a low molecular weight aliphatic oxygen-containing compound selected from the group consisting of methanol, ethanol, isopropanol, acetone, and dioxane; said diluent being a polysaccharide having more than four monosaccharide units and being selected from the group consisting of sodium carboxymethyl cellulose, sodium alginate, and citrus pectin; agitating said dispersion during said contacting step; removing the precipitate-coated diluent from the liquor and drying the same; recovering as product an intimate mixture of finely divided, solid, dry, stable diluent and enzyme; said mixture (1) being free of gummy, sticky, and lumpy characteristics, (2) being homogeneous such that the components thereof are mechanically inseparable and are non-stratifying during handling, transportation, and storage, (3) having a reproducible enzyme potency, and (4) being suitable for food use.

2. Process of claim 1 wherein the enzyme is glucose oxidase, the solvent is ethanol, and the diluent is sodium carboxymethyl cellulose.

References Cited in the file of this patent
UNITED STATES PATENTS

| | | |
|---|---|---|
| 991,560 | Takamine | May 9, 1911 |
| 1,444,250 | Kern | Feb. 6, 1923 |
| 2,321,270 | Bacon | June 8, 1943 |
| 2,594,356 | Schwimmer | Apr. 29, 1952 |

OTHER REFERENCES

Hollabaugh: "Cellulose Gum" in Industry Chem. Trade Jour. and Chem. Eng., Jan. 4, 1946, p. 7.